United States Patent
Albrecht

(10) Patent No.: US 8,003,146 B2
(45) Date of Patent: *Aug. 23, 2011

(54) METHOD FOR SUPPLYING IN-ROOM BEVERAGE SERVICE

(75) Inventor: Douglas A. Albrecht, St. Louis, MO (US)

(73) Assignee: Courtesy Products, LLC, Saint Louis, MO (US)

(*) Notice: Subject to any disclaimer, the term of this patent is extended or adjusted under 35 U.S.C. 154(b) by 497 days.

This patent is subject to a terminal disclaimer.

(21) Appl. No.: 11/931,511

(22) Filed: Oct. 31, 2007

(65) Prior Publication Data

US 2008/0057171 A1    Mar. 6, 2008

Related U.S. Application Data

(60) Continuation of application No. 10/942,766, filed on Sep. 16, 2004, now Pat. No. 7,311,037, which is a division of application No. 10/136,543, filed on May 1, 2002, now Pat. No. 7,081,263.

(51) Int. Cl.
*A23F 5/00* (2006.01)
(52) U.S. Cl. .......... 426/433; 426/82; 426/106; 426/108; 426/392; 426/402; 426/410; 426/115; 426/294
(58) Field of Classification Search .............. 426/82, 426/433, 106, 108, 392, 402, 410, 115, 294
See application file for complete search history.

(56) References Cited

U.S. PATENT DOCUMENTS

| | | |
|---|---|---|
| 1,412,388 A | 4/1922 | Clemont |
| 1,555,515 A | 4/1925 | Peal |
| 2,383,144 A | 2/1945 | Moore |
| 2,438,844 A | 3/1948 | Dale |
| 2,615,384 A | 10/1952 | Ranz |

(Continued)

FOREIGN PATENT DOCUMENTS

DE    23 27 264 A1    1/1975

(Continued)

OTHER PUBLICATIONS

Fader. "1990 Trend: Convenience Coffee Packaging." 1990. http://www.thefreelibrary.com/1990+trend:+convenience+coffee+packaging-a08935021.*

(Continued)

*Primary Examiner* — Anthony Weier
(74) *Attorney, Agent, or Firm* — Dean Small; The Small Patent Law Group

(57) ABSTRACT

A method including the steps of: providing an electric coffee brewing machine; providing a single-use, disposable brew basket, inserting the disposable brew basket into the electric coffee brewing machine; brewing a single cup of coffee with the electric coffee brewing machine; and discarding the disposable brew basket after the single cup of coffee has been brewed. The electric coffee brewing machine has a cold water reservoir, an electric heating element for heating the water, and a basket receiving recess. The disposable brew basket has a bottom wall and at least one side wall extending generally upwardly from the bottom wall to define a brewing reservoir for receiving heated water from the electric coffee brewing machine. The bottom wall of the basket has at least one port located in a central portion thereof to permit brewed coffee to flow from the disposable brew basket. The disposable brew basket is inserted into the basket receiving recess of the electric coffee brewing machine before brewing.

17 Claims, 3 Drawing Sheets

U.S. PATENT DOCUMENTS

| | | | |
|---|---|---|---|
| 2,676,531 A | 4/1954 | Popeil | |
| 2,732,787 A | 1/1956 | Osborne | |
| 2,743,664 A * | 5/1956 | Dale | 99/295 |
| 2,791,367 A | 5/1957 | Mefford | |
| 2,822,273 A | 2/1958 | Anderson | |
| 2,899,310 A | 8/1959 | Dale | |
| 2,968,560 A | 1/1961 | Goros | |
| 3,083,101 A | 3/1963 | Noury | |
| 3,091,360 A | 5/1963 | Bryant | |
| 3,094,917 A | 6/1963 | Rombouts | |
| 3,139,344 A | 6/1964 | Welsman | |
| 3,292,527 A | 12/1966 | Stasse | |
| 3,320,073 A | 5/1967 | Devaris et al. | |
| 3,344,943 A | 10/1967 | Zipper | |
| 3,345,935 A | 10/1967 | Waline | |
| 3,384,004 A | 5/1968 | Pavlman et al. | |
| 3,401,827 A | 9/1968 | Messina | |
| 3,411,431 A | 11/1968 | Moerllnl et al. | |
| 3,434,589 A | 3/1969 | Valtri et al. | |
| 3,445,237 A | 5/1969 | Gidge | |
| 3,446,624 A | 5/1969 | Lusdtke | |
| 3,450,024 A | 6/1969 | Martin | |
| 3,481,501 A | 12/1969 | Anderson | |
| 3,511,166 A | 5/1970 | Bixby, Sr. | |
| 3,561,349 A | 2/1971 | Endo et al. | |
| 3,566,772 A | 3/1971 | Oliver et al. | |
| 3,599,557 A | 8/1971 | Leal | |
| 3,610,132 A | 10/1971 | Martin et al. | |
| 3,620,155 A | 11/1971 | Bixby, Jr. | |
| 3,658,615 A | 4/1972 | Amberg | |
| D225,077 S | 11/1972 | Martin et al. | |
| 3,795,182 A | 3/1974 | Van Damme | |
| 3,800,690 A | 4/1974 | Molenaar et al. | |
| 3,823,656 A | 7/1974 | Vander Veken | |
| 3,935,318 A | 1/1976 | Mihailide | |
| 3,938,695 A | 2/1976 | Ruff | |
| 3,943,058 A | 3/1976 | Wurm | |
| 3,983,797 A | 10/1976 | Wurm | |
| 3,985,069 A | 10/1976 | Cavalluzzi | |
| 4,086,848 A | 5/1978 | Hahn | |
| 4,123,228 A | 10/1978 | Frei | |
| 4,136,202 A | 1/1979 | Favre | |
| 4,149,454 A | 4/1979 | Kemp | |
| 4,167,899 A | 9/1979 | McCormick | |
| 4,214,673 A | 7/1980 | Heath et al. | |
| 4,382,402 A | 5/1983 | Alvarez | |
| 4,389,925 A | 6/1983 | Piana | |
| 4,446,158 A | 5/1984 | English et al. | |
| 4,471,689 A | 9/1984 | Piana | |
| 4,487,114 A | 12/1984 | Abdenour | |
| 4,520,716 A | 6/1985 | Hayes | |
| 4,546,237 A * | 10/1985 | Collins | 392/498 |
| 4,550,024 A | 10/1985 | Le Granse | |
| 4,584,101 A | 4/1986 | Kataoka | |
| D286,006 S | 10/1986 | Kataoka | |
| 4,656,932 A | 4/1987 | Kopp | |
| 4,697,503 A | 10/1987 | Okabe et al. | |
| 4,704,954 A | 11/1987 | Mollenhoff | |
| 4,728,281 A * | 3/1988 | McGuffin et al. | 426/433 |
| 4,745,852 A * | 5/1988 | Sager | 99/280 |
| 4,746,519 A | 5/1988 | Wright et al. | |
| 4,805,523 A * | 2/1989 | Stuckey et al. | 99/281 |
| 4,860,645 A | 8/1989 | van der Lijn et al. | |
| 4,867,993 A | 9/1989 | Nordskog | |
| 4,875,406 A | 10/1989 | Holter et al. | |
| 4,875,408 A | 10/1989 | McGee | |
| 4,948,601 A | 8/1990 | Serbu | |
| 5,028,328 A | 7/1991 | Long | |
| 5,036,755 A * | 8/1991 | Abdenour | 99/306 |
| 5,063,838 A | 11/1991 | Matuschek | |
| 5,081,915 A | 1/1992 | Beumer | |
| 5,190,653 A | 3/1993 | Herrick | |
| 5,242,702 A | 9/1993 | Fond | |
| 5,243,164 A | 9/1993 | Erickson | |
| 5,267,507 A | 12/1993 | Enomoto | |
| 5,287,797 A | 2/1994 | Grykiewicz et al. | |
| 5,325,765 A | 7/1994 | Sylvan et al. | |
| 5,337,653 A | 8/1994 | Sellers | |
| 5,398,596 A | 3/1995 | Fond | |
| 5,424,083 A | 6/1995 | Lozito | |
| 5,632,193 A | 5/1997 | Shen | |
| 5,771,777 A | 6/1998 | Davis | |
| 5,824,218 A | 10/1998 | Gasser | |
| 5,840,189 A | 11/1998 | Sylvan | |
| D408,679 S | 4/1999 | Potts | |
| 5,906,844 A | 5/1999 | Stahli et al. | |
| 5,948,455 A | 9/1999 | Schaeffer et al. | |
| 5,952,028 A | 9/1999 | Lesser | |
| 5,967,019 A | 10/1999 | Johnson et al. | |
| 6,038,963 A | 3/2000 | Patterson et al. | |
| 6,076,450 A | 6/2000 | DiGiorgio, Jr. | |
| 6,079,315 A | 6/2000 | Beaulieu | |
| 6,079,318 A | 6/2000 | Davis | |
| 6,082,247 A | 7/2000 | Beaulicu | |
| 6,117,471 A | 9/2000 | King | |
| 6,142,063 A | 11/2000 | Beaulieu | |
| 6,164,191 A | 12/2000 | Liu et al. | |
| 6,182,554 B1 | 2/2001 | Beaulieu | |
| 6,245,371 B1 | 6/2001 | Gutwein et al. | |
| 6,260,476 B1 | 7/2001 | Pope | |
| D452,433 S | 12/2001 | Lazaris | |
| D452,434 S | 12/2001 | Sweeney | |
| 6,440,256 B1 | 8/2002 | Gordon | |
| D462,865 S | 9/2002 | Honan | |
| 6,468,332 B2 | 10/2002 | Goglio | |
| D474,110 S | 5/2003 | Sweeney | |
| D474,111 S | 5/2003 | Lazaris | |
| 6,589,577 B2 | 7/2003 | Lazaris | |
| 6,606,938 B2 | 8/2003 | Taylor | |
| 6,607,762 B2 | 8/2003 | Lazaris | |
| 6,644,173 B2 | 11/2003 | Lazaris | |
| 6,645,537 B2 * | 11/2003 | Sweeney et al. | 426/79 |
| 6,655,260 B2 | 12/2003 | Lazaris | |
| 6,658,989 B2 | 12/2003 | Sweeney | |
| 6,666,130 B2 | 12/2003 | Taylor | |
| 6,672,200 B2 | 1/2004 | Duffy | |
| 6,708,600 B2 | 3/2004 | Winkler | |
| D489,215 S | 5/2004 | Honan | |
| 6,740,345 B2 * | 5/2004 | Cai | 426/77 |
| 6,758,130 B2 | 7/2004 | Sargent | |
| 6,810,788 B2 | 11/2004 | Hale | |
| D502,362 S | 3/2005 | Lazaris | |
| 6,889,599 B2 | 5/2005 | Koslow | |
| D513,572 S | 1/2006 | Schaffeld | |
| 7,081,263 B2 * | 7/2006 | Albrecht | 426/82 |
| 7,127,983 B2 | 10/2006 | Huda | |
| 7,150,219 B2 | 12/2006 | De'Longhi | |
| 7,165,488 B2 | 1/2007 | Bragg | |
| D544,299 S | 6/2007 | Schaffeld | |
| 7,258,884 B2 * | 8/2007 | Albrecht | 426/433 |
| 7,311,037 B2 * | 12/2007 | Albrecht | 99/306 |
| 7,347,138 B2 | 3/2008 | Bragg | |
| 7,360,418 B2 | 4/2008 | Pelovitz | |
| 7,377,162 B2 | 5/2008 | Lazaris | |
| 7,398,726 B2 | 7/2008 | Streeter | |
| 7,513,192 B2 | 4/2009 | Sullivan | |
| 7,523,695 B2 | 4/2009 | Streeter | |
| 7,543,527 B2 | 6/2009 | Schmed | |
| 7,552,672 B2 | 6/2009 | Schmed | |
| 2002/0144603 A1 | 10/2002 | Taylor | |
| 2005/0287251 A1 | 12/2005 | Lazaris | |
| 2006/0169149 A1 | 8/2006 | Voss | |
| 2006/0174773 A1 | 8/2006 | Taylor | |
| 2006/0288776 A1 | 12/2006 | Pelovitz | |
| 2006/0288777 A1 | 12/2006 | Lazaris | |
| 2006/0292012 A1 | 12/2006 | Brudevold | |
| 2007/0056994 A1 | 3/2007 | Woodnorth | |
| 2007/0186784 A1 | 8/2007 | Liverani | |
| 2007/0221066 A1 | 9/2007 | Sullivan | |
| 2007/0221570 A1 | 9/2007 | Aregger | |
| 2008/0026121 A1 | 1/2008 | Mastropasqua | |
| 2008/0095904 A1 | 4/2008 | Sullivan | |
| 2008/0115674 A1 | 5/2008 | Huang | |
| 2008/0134902 A1 | 6/2008 | Zimmerman | |
| 2008/0257165 A1 | 10/2008 | Bolzicco | |

FOREIGN PATENT DOCUMENTS

| | | |
|---|---|---|
| DE | 35 04 441 A1 | 8/1986 |
| EP | 0334573 B1 | 2/1993 |
| EP | 01101430 A1 | 5/2001 |
| EP | 1980501 A1 | 10/2008 |
| FR | 2 556 323 | 12/1983 |
| GB | 1064010 | 4/1967 |
| GB | 2 023 086 A | 12/1979 |
| GB | 2123685 A | 2/1984 |
| WO | WO-0051478 | 9/2000 |
| WO | WO-01/58786 A1 | 8/2001 |
| WO | WO-01/60220 A1 | 8/2001 |
| WO | WO-2005/120314 A1 | 12/2005 |
| WO | WO-2007/072413 A2 | 6/2007 |
| WO | WO-2008/126045 A1 | 10/2008 |
| WO | WO-2009/114119 A1 | 9/2009 |

OTHER PUBLICATIONS

Final Office Action dated Mar. 21, 2006; U.S. Appl. No. 10/136,543, filed May 1, 2002; 11 pages.
Office Action dated Oct. 11, 2005; U.S. Appl. No. 10/136,543, filed May 1, 2002; 20 pages.
Final Office Action dated Mar. 1, 2005; U.S. Appl. No. 10/136,543, filed May 1, 2002; 29 pages.
Office Action dated Jul. 29, 2004; U.S. Appl. No. 10/136,543, filed May 1, 2002; 10 pages.
Final Office Action dated Jun. 3, 2004; U.S. Appl. No. 10/136,543, filed May 1, 2002; 6 pages.
Office Action dated Feb. 13, 2004; U.S. Appl. No. 10/136,543, filed May 1, 2002; 9 pages.
Final Office Action dated Jul. 25, 2007; U.S. Appl. No. 10/942,766, filed Sep. 16, 2004; 8 pages.
Office Action dated Jan. 18, 2007; U.S. Appl. No. 10/942,766, filed Sep. 16, 2004; 6 pages.
Final Office Action dated Sep. 11, 2006; U.S. Appl. No. 10/942,766, filed Sep. 16, 2004; 9 pages.
Office Action dated May 8, 2006; U.S. Appl. No. 10/942,766, filed Sep. 16, 2004; 8 pages.
Office Action dated Sep. 19, 2005; U.S. Appl. No. 10/942,766, filed Sep. 16, 2004; 5 pages.
Office Action dated Nov. 14, 2006; U.S. Appl. No. 10/943,253, filed Sep. 16, 2004; 13 pages.
Office Action dated Jun. 19, 2009; U.S. Appl. No. 11/519,620, filed Sep. 12, 2009; 12 pages.
The Keurig Premium Coffee System, 7 pgs.
Hausmann, Hotel Interactive. In-Room coffee Rates as "Must Have Add-On for Java Lovers", Jun. 7, 1999, www.hotelinteractive.com.

\* cited by examiner

METHOD FOR SUPPLYING IN-ROOM BEVERAGE SERVICE

RELATED APPLICATION

This is a continuation of patent application of application Ser. No. 10/942,766, filed Sep. 16, 2004, issued as U.S. Pat. No. 7,311,037 on Dec. 25, 2007, entitled "DISPOSABLE BREW BASKET FOR ELECTRIC COFFEE MAKER" which is a divisional patent application of application Ser. No. 10/136,543, filed May 1, 2002, now U.S. Pat. No. 7,081,263, entitled "DISPOSABLE BREW BASKET FOR ELECTRIC COFFEE MAKER", issued as U.S. Pat. No. 7,081,263 on Jul. 25, 2006 the complete subject matter of which are hereby expressly incorporated in their entirety.

FIELD OF THE INVENTION

The present invention relates to electric coffee brewing machines. More particularly, the present invention relates to a novel single-use disposable brew basket for an electric coffee maker.

BACKGROUND OF THE INVENTION

For years, drip-type electric brewing machines have been used as an efficient means for making coffee. In general, these electric coffee brewing machine include a cold water reservoir, an electric resistance heating element for heating the water, and a reusable plastic brew basket for holding ground coffee in a paper coffee filter. To make coffee, cold water is poured into the water reservoir and ground coffee is placed in a coffee filter, which is in turn placed in the brew basket. The cold water is heated by the electric heating element, and the heated water then saturates the ground coffee. The brewed coffee then drips out into a receiving vessel, e.g., a coffee pot, which is positioned below the brew basket. After brewing is complete, the paper filter and used coffee grounds are taken out of the plastic brew basket and discarded. Then, the brew basket and coffee pot are cleaned for re-use.

While such drip coffee makers are relatively fast and efficient, the process of cleaning the plastic brew basket and coffee pot after each use is time consuming. Moreover, if the brew basket and coffee pot are not cleaned regularly, the quality and taste of the brewed coffee is compromised. A related problem occurs when such drip coffee makers are used to brew flavored coffee. Unless the brew basket and coffee pot are cleaned thoroughly, the taste and strong scent of flavored coffee tends to linger in the brew basket and coffee pot and can be detected when these components are reused to brew coffee of a different flavor. While these concerns alone have not been significant enough to deter individuals from using drip-type electric coffee makers at home, these drawbacks are multiplied in the hotel industry, where such coffee makers are often provided by hotels for daily in-room use by their thousands of guests. The task of regularly cleaning the thousands of brewing container and coffee pots is left to the housekeeping or other hotel staff. Thus, there is a need to simplify maintenance of drip-type electric coffee brewing machines, especially in the context of the hotel industry, where thousands of such machines are used daily by hotel guests.

SUMMARY OF THE INVENTION

It is an object of the present invention to improve the efficiency of drip-type electric coffee brewing machines, and to reduce the time required for appropriately maintaining such machines. It is a more specific object of the invention to provide a single-use, disposable brew basket for use with a conventional drip-type electric coffee brewing machine. Another object of the invention is to provide a single-use, disposable brew basket that includes an integral single-use coffee filter pack. Still another object of the invention is to provide a single-use, disposable brew basket for a drip-type electric coffee brewing machine that is designed for brewing a single cup of coffee directly into a coffee cup.

In general, a method of brewing a single cup of coffee comprises the steps of: providing an electric coffee brewing machine; providing a single-use, disposable brew basket, inserting the disposable brew basket into the electric coffee brewing machine; brewing a single cup of coffee with the electric coffee brewing machine; and discarding the disposable brew basket after the single cup of coffee has been brewed. The electric coffee brewing machine has a cold water reservoir and a basket receiving recess. The disposable brew basket has a bottom wall and at least one side wall extending generally upwardly from the bottom wall to define a brewing reservoir for receiving heated water from the electric coffee brewing machine. The bottom wall of the basket has a port located in a central portion thereof to permit brewed coffee to flow from the disposable brew basket. The disposable brew basket is inserted into the basket receiving recess of the electric coffee brewing machine before brewing.

In another aspect of the present invention, a method of brewing coffee comprises the steps of: providing an electric coffee brewing machine having a cold water reservoir, an electric heating element for heating the water, and a reusable brew basket; providing a single-use, disposable brew basket; removing the reusable brew basket from the electric coffee brewing machine and replacing the same with the disposable brew basket; brewing coffee with the electric coffee brewing machine; and discarding the disposable brew basket after the coffee has been brewed. The reusable brew basket of the electric coffee machine has a bottom wall and at least one side wall extending generally upwardly from the bottom wall to define a brewing reservoir for receiving heated water from the electric coffee brewing machine. The disposable brew basket has substantially the same dimensions as the reusable brew basket of the electric coffee brewing machine. The disposable brew basket has a bottom wall and at least one side wall extending generally upwardly from the bottom wall to define a brewing reservoir for receiving heated water from the electric coffee brewing machine.

In still another aspect of the present invention, a method of brewing a single cup of coffee comprises the steps of: providing an electric coffee brewing machine having a reusable brew basket; providing a single-use, disposable brew basket of substantially the same dimensions as the reusable brew basket of the electric coffee brewing machine, providing a coffee filter pack comprising a liquid permeable pouch containing ground coffee within the brewing reservoir of the disposable brew basket; removing the reusable brew basket from the electric coffee brewing machine and replacing the same with the disposable brew basket and coffee filter pack; brewing a single cup of coffee with the electric coffee brewing machine; and discarding the disposable brew basket and coffee filter pack after the single cup of coffee has been brewed.

In yet another aspect of the invention, a disposable brew basket for use in an electric coffee brewing machine comprises a bottom wall and a plurality of side walls. The side walls extend generally upwardly from a perimeter of the bottom wall to define a brewing reservoir. The bottom wall has a port located in a central portion of the bottom wall adapted to permit brewed coffee to flow from the brewing reservoir of the disposable brew basket. Each of the side walls of the basket extends upwardly and outwardly from the bottom wall at an angle to facilitate nesting of the basket with adjacent, aligned baskets of like configuration. The bottom wall and side walls are of a monolithic piece of vacuum formed high-impact polystyrene.

Further objects, features, and advantages of the present invention, as well as the structure and operation of various embodiments of the present invention, are described in detail below with reference to the accompanying drawings.

Figure 1:
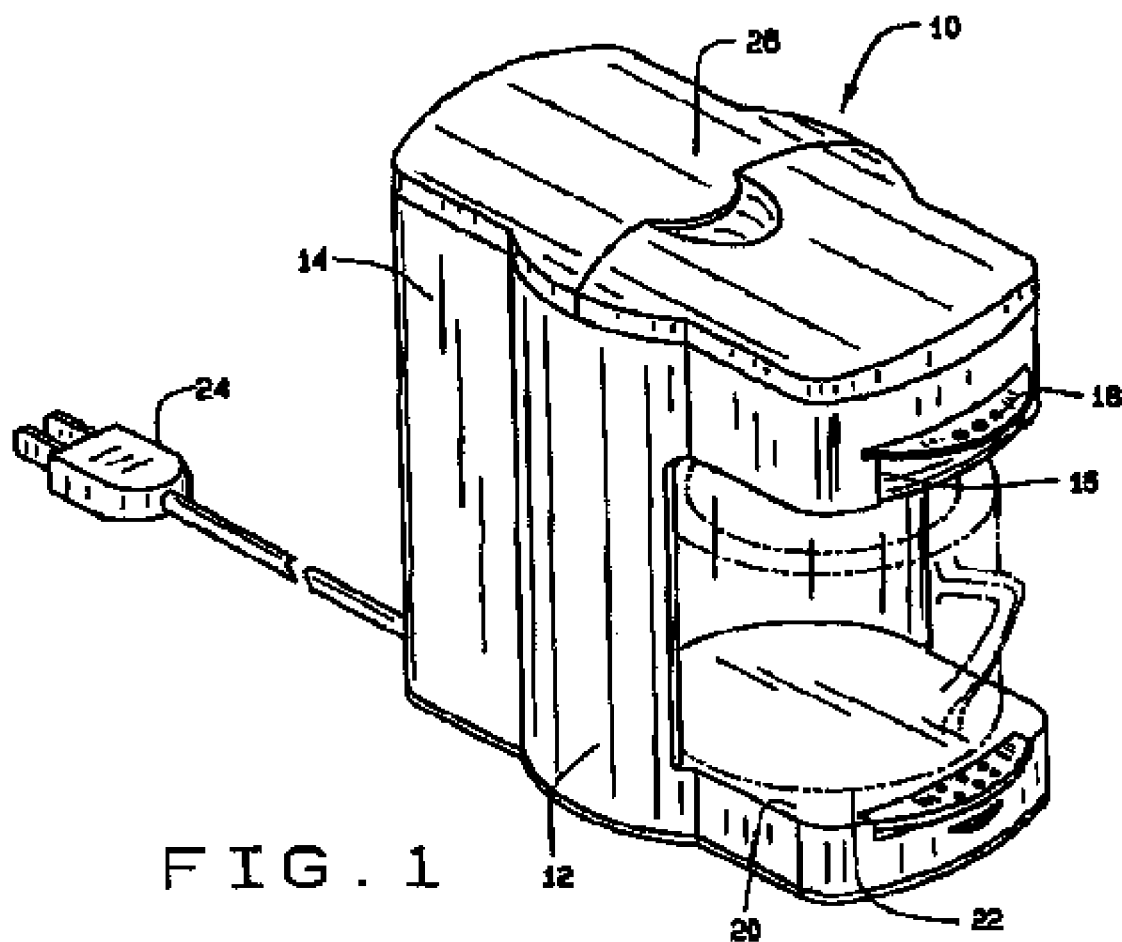
FIG. 1 is a perspective view of an electric coffee brewing machine used in the practice of the present invention.

Reference characters used in these drawings correspond with reference characters used throughout the Detailed Description of the Preferred Embodiments, which follows. These drawings, which are incorporated in and form a part of the specification, illustrate the preferred embodiments of the present invention and, together with the description, serve to explain the principles of the invention.

DETAILED DESCRIPTION OF THE PREFERRED EMBODIMENTS

A drip-type electric coffee brewing machine of the present invention is represented generally in FIG. 1 by the reference numeral 10. In general, the electric coffee machine 10 comprises an outer housing 12, preferably of molded plastic or another non-conductive material, a cold water reservoir 14, a basket-receiving recess 16, a brew basket 18, a receiving vessel platform 20 for supporting a coffee-receiving vessel, such as a coffee pot or coffee cup 22, and an electric power cord 24. In most respects, the electric coffee machine 10 is similar to other conventional drip-type electric coffee brewing machines. To make coffee, a lid 26 to the cold water reservoir 14 is lifted and cold water (not shown) is poured into the reservoir 26. An appropriate amount of ground coffee (not shown) is placed in a paper coffee filter (not shown), which is in turn placed in the brew basket 18. The cold water is heated by an electric heating element (not shown) housed in the machine 10, and the heated water then flows into the brew basket 18 and saturates the ground coffee contained therein. Brewed coffee then drips out into the receiving vessel 22, preferably a coffee cup, which is positioned immediately below the brew basket 18.

The brew basket 18 shown in FIG. 1 is conventional and may be made of injection molded plastic or another suitable material that is durable and corrosion resistant. The brew basket 18 shown in FIG. 1 can be reused many times, as is well known in the art. After brewing is complete, the paper filter and used coffee grounds are taken out of the reusable brew basket 18 and discarded. Then, the brew basket 18 is cleaned for re-use.

Figure 2:
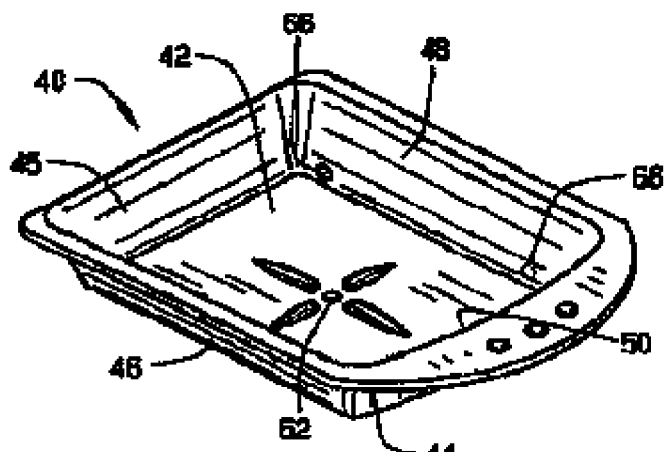
FIG. 2 is a perspective view of a disposable brew basket of the present invention.
Figure 3:
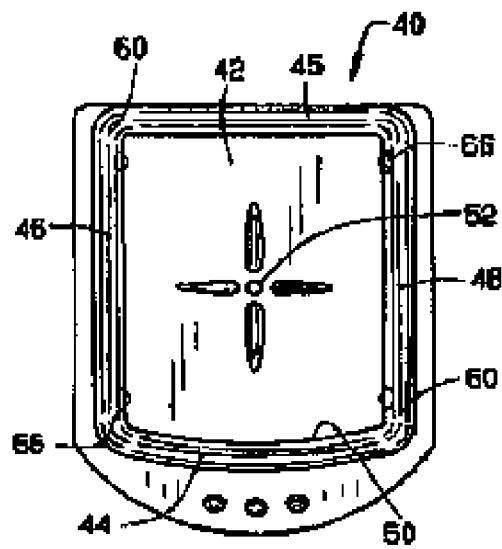
FIG. 3 is a top plan view of the disposable brew basket of FIG. 2.
Figure 4:
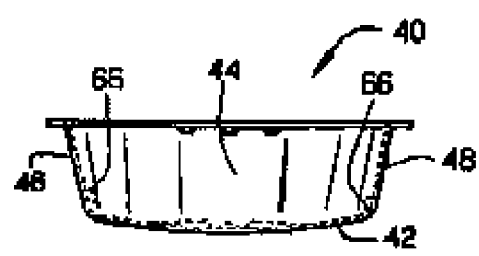
FIG. 4 is a front elevational view of the disposable brew basket of FIG. 2.
Figure 5:
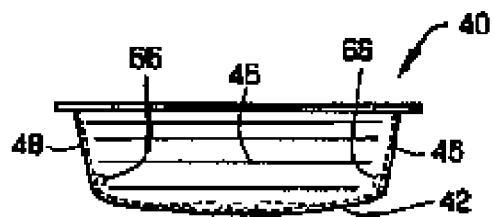
FIG. 5 is a rear elevational view of the disposable brew basket of FIG. 2.
Figure 6:
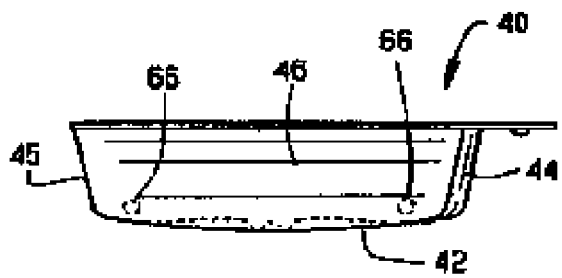
FIG. 6 is a left side elevational view of the disposable brew basket of FIG. 2.
Figure 7:
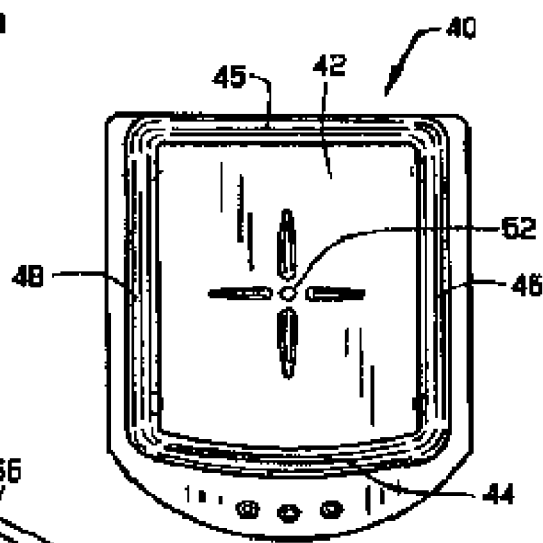
FIG. 7 is a bottom plan view of the disposable brew basket of FIG. 2.

FIGS. 2 through 7 show a single-use, disposable brew basket 40 of the present invention. Preferably, the disposable brew basket 40 is shaped and dimensioned to fit within the basket-receiving recess 16 of the electric coffee machine 10, in lieu of the reusable brew basket 18. As shown in FIGS. 2 through 7, the disposable brew basket 40 has a bottom wall 42, a front wall 44, a rear wall 45, a left side wall 46 and a right side wall 48. The front, rear, left and right side walls extend generally upwardly from the bottom wall 42 to define a breaking reservoir 50 for holding coffee grounds and for receiving heated water from the electric coffee brewing machine 10. As shown in FIGS. 2, 3 and 7, the bottom wall 42 of the basket 40 preferably has a single, central port 52 or "drip spout" to permit brewed coffee to flow from the brewing reservoir 50 of the disposable brew basket 40 and into the receiving vessel 22.

Preferably, the bottom wall 42, front wall 44, rear wall 45, left side wall 46 and right side wall 48 are all of a monolithic construction. That is, these components are preferably formed as a single piece. In the preferred embodiment of the invention, the disposable brewing chamber 40 is made of vacuum formed high-impact polystyrene. This material is preferred because it is relatively inexpensive, it is generally easy to work with in manufacturing, and it produces a sufficiently strong product with a minimum thickness of material. However, other disposable materials having similar qualities could be used without departing from the scope of the present invention.

Figure 8:
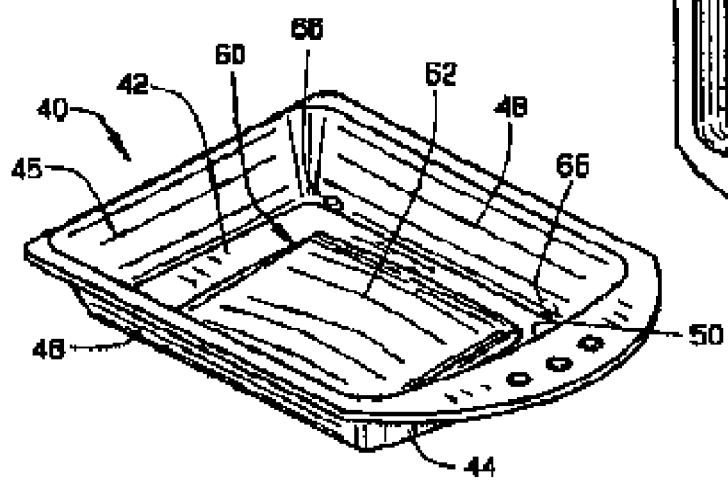
FIG. 8 is a perspective view of the disposable brew basket of FIG. 2 with an integral coffee filter pack.

As shown in FIG. 8, the disposable brew basket 40 may also include an integral coffee filter pack 60 comprising a liquid permeable pouch 62 (e.g., a paper filter pouch) containing an amount of ground coffee appropriate for brewing a single cup of brewed coffee. The coffee filter pack 60 is not unlike a tea bag, as it contains an amount of ground coffee that is appropriate for brewing a single cup of the beverage, and is designed to be used once and then discarded. Alternatively, a coffee filter pack containing enough ground coffee to brew more than a single cup in a single brewing operation could be used without departing from the scope of invention.

Preferably, one coffee filter pack 60 and one disposable brew basket 40 are packaged together for use. The coffee filter pack 60 may or may not be adhered or otherwise connected to the bottom wall 42 of the basket 40. The coffee filter packs 60 and disposable brew baskets 40 may also be packaged and sold separately from one another without departing from the scope of the invention.

Thus, in use, the disposable brew basket 40 is inserted into the basket receiving recess 16 of the electric coffee brewing machine 10, in lieu of the reusable brew basket 18. Preferably, the coffee filter pack 60 is placed into the brewing reservoir 50 of the disposable brew basket 40, in lieu of a conventional paper filter and loose coffee grinds. In accordance with the present invention, both the disposable brew basket 40 and the coffee filter pack 60 are then discarded after use, i.e., after one brewing operation.

More specifically, a method of brewing a single cup of coffee comprises the steps of: providing an electric coffee brewing machine such as machine 10; providing a single-use, disposable brew basket 40 having a brewing reservoir 50 for receiving heated water from the electric coffee brewing machine 10; providing a coffee filter pack 60 comprising a liquid permeable pouch 62 containing ground coffee; placing the coffee filter pack 60 within the brewing reservoir 50 of the disposable brew basket 40; inserting the disposable brew basket 40 into the basket receiving recess 16 of the electric coffee brewing machine 10; brewing a single cup of coffee with the electric coffee brewing machine 10; and discarding the disposable brew basket 40 and coffee filter pack 60 after the single cup of coffee has been brewed.

A related method of the present invention comprises the steps of providing an electric coffee brewing machine 10 including a reusable brew basket 18 with a brewing reservoir; providing a single-use, disposable brew basket 40 of substantially the same dimensions as the reusable brew basket 18 of the electric coffee brewing machine 10; providing a coffee filter pack 60 comprising a liquid permeable pouch 62 containing ground coffee; placing the coffee filter pack 60 within the brewing reservoir 50 of the disposable brew basket 40; removing the reusable brew basket 18 from the electric coffee brewing machine 10 and replacing it with the disposable brew basket 40; brewing coffee with the electric coffee brewing machine 10; and discarding the disposable brew basket 40 and coffee filter pack 60 after the coffee has been brewed.

Figure 9:
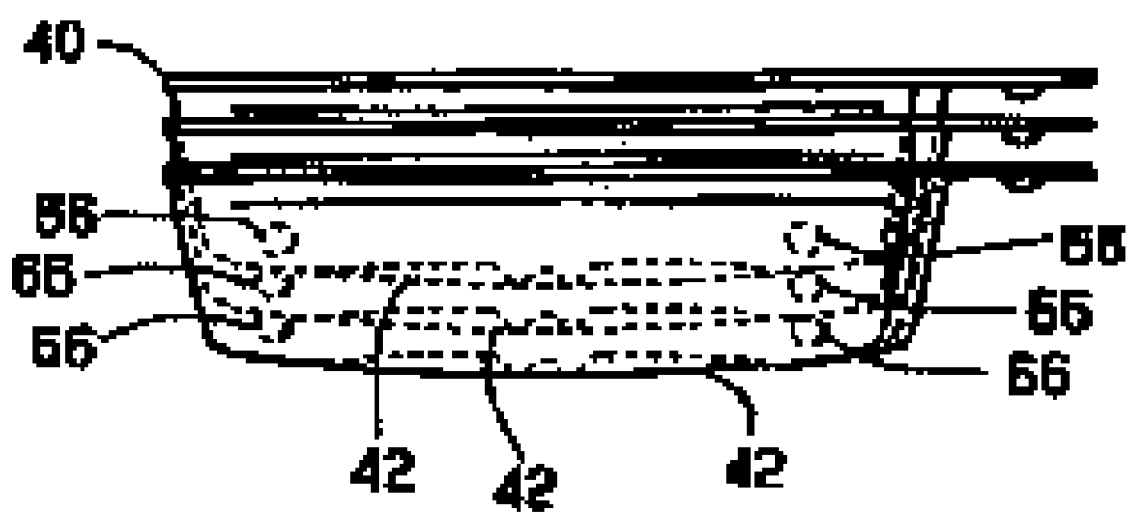
FIG. 9 is a side elevational view of a nested stack of disposable brew baskets.

As shown in FIGS. 2 through 7, the front wall 44, rear wall 45, left side wall 46 and right side wall 48 of the disposable brew basket 40 are preferably tapered outwardly, i.e., they preferably extend generally upwardly and outwardly from the perimeter of the bottom wall 42, to facilitate nesting of the disposable brew basket 40 with adjacent, aligned baskets of like configuration (see FIG. 9). This permits multiple nested disposable brew baskets 40 to be packaged, stored and/or shipped together at minimal cost.

As best shown in FIGS. 2 and 3, the disposable brew basket 40 also preferably includes at least one integral spacer 66 for limiting the extent of nesting of adjacent, aligned baskets 40. Preferably, the integral spacers 66 are located on the left and/or right side walls 46 and 48 of the disposable brew basket 40, though spacers could be used on the front and/or rear walls 44 and 45 of the basket 40 without departing from the scope of the present invention. As shown in FIGS. 2 and 3, the spacer is preferably located on an inner surface of its associated wall of the disposable brew basket 40. Preferably, the spacer 66 includes a projection that extends generally inwardly from its associated side wall. The projection is adapted to contact and abut against a lower surface of the bottom wall 42 of an adjacent, nesting basket in a manner to space the nested baskets 40 from one another. Thus, the spacers 66 permit a plurality of the disposable brew baskets 40 to be "controllably nested" (FIG. 9) by preventing overly tight nesting and thereby facilitating separation prior to repackaging or use.

Preferably, in a stack of controllably nested, disposable brew baskets 40, the location of the spacers 66 alternates so that the location of the spacers 66 of adjacent baskets in the stack differ from one another to prevent overly tight nesting of the baskets 40 and of the spacers 66 themselves, in the preferred embodiment of the invention, each disposable brew basket 40 includes only one spacer 66. However, multiple spacers, in the same or alternating locations, could be used without departing from the scope of the invention. In any case, however, the bottom wall 42, side walls 44, 45, 46 and 48 and spacers 66 are all preferably formed as a single piece of vacuum formed high-impact polystyrene.

It should be understood that, although at least one of the novel methods described above includes the steps of providing a reusable brew basket 18, and then removing it and replacing it with the disposable brew basket 40, there are reasons why it may be preferable to practice the invention without these steps (i.e., without providing a reusable brew basket 18 at all), especially in the context of the hotel industry where such coffee makers are provided by hotels for daily in-room use by thousands of hotel guests. Again, the process of cleaning a reusable plastic brew basket and glass coffee pot after each use is time consuming, and failure to do so properly can compromise the quality and taste of the brewed coffee. This is especially so when the coffee makers are used to brew flavored coffee, which have tastes and scents that tend to linger in the permanent brew basket and coffee pot. These are among the reasons why a single-use, disposable brew basket designed to brew directly into a coffee cup is preferred in the present invention. However, in the context of the hotel industry, there are additional reasons why this is preferred. For example, if the drip coffee maker 10 is provided without a permanent "reusable" brew basket 18 (either because the coffee maker is manufactured and sold without one or because the hotel management removes it before placing the coffee maker in the room), then hotel guests and staff are less likely to steal the coffee maker, which is virtually useless without a brew basket. In addition to theft deterrence, providing a "single cup" coffee maker 10 (designed to brew directly into a coffee cup as shown in FIG. 1) without a reusable brew basket 18 and without a glass coffee pot eliminates risk of injury associated with handling these components. Also, because the "single cup" coffee maker 10 is preferably designed to brew directly into a coffee cup, there is no need for a heating plate, which further reduces the risk of injury.

In view of the foregoing, it can be seen that the several objects of the invention are achieved and attained. The embodiments disclosed herein were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather limiting. Thus, the breadth and scope of the present invention should not be limited by any of the above-described exemplary embodiments, but should be defined only in accordance with the following claims appended thereto and their equivalents.

What is claimed:

1. A method of supplying in-room beverage service to a lodging establishment, the method comprising:
   providing a drip-type beverage dispenser for use in a room of the lodging establishment by a number of different lodging guests expected to stay in the room over a period of time; and
   providing a plurality of drip-type single serving disposable brew baskets for use with the drip-type beverage dispenser, the brew baskets comprising a bottom and a wall extending generally upwardly from the bottom to define a brewing reservoir, the bottom and wall being formed with a disposable rigid one-piece construction, the bottom having a drip port there through to permit a brewed beverage to flow from the brewing reservoir of the disposable brew basket into a single serving beverage container, the wall of the basket extending upwardly from the bottom to an open top, wherein the plurality of drip-type single serving disposable brew baskets comprises a number of the brew baskets related to the number of different lodging guests expected to stay in the room over the period of time.

2. The method of claim 1, further comprising packaging at least one said disposable brew basket in a first package and packaging at least one said disposable filter pack in a second package, the first and second packages being separate from one another.

3. The method of claim 1, further comprising providing a plurality of disposable filter packs for use with the beverage dispenser, the filter packs containing an amount of grounds to brew approximately only a single serving of brewed beverage.

4. The method of claim 1, wherein the disposable brew baskets constitute single serving disposable brew baskets and the brewing reservoir has a size dimensioned appropriate to make approximately only a single serving of beverage during a single brewing operation.

5. The method of claim 3, wherein the plurality of disposable brew baskets and the plurality of filter packs are provided in equal numbers and in a one to one relation with one another.

6. The method of claim 1, wherein providing the beverage dispenser includes providing a number of separate beverage dispensers for an equal number of rooms, and wherein the plurality of disposable brew baskets includes multiple disposable brew baskets for use with each of the separate beverage dispensers.

7. The method of claim 3, further comprising, after use of the brew basket and filter pack, replacing a used brew basket and a used filter pack in the room.

8. A method of supplying in-room beverage service to a lodging establishment, the lodging establishment having at least one room that contains a single drip-type beverage dispenser for in-room use by a number of different lodging guests expected to stay in the room over a period of time, the beverage dispenser comprising a water reservoir, an electrical heating element for heating water, and a location at which heated water is discharged, the method comprising:
providing a plurality of drip-type single serving disposable brew baskets for use with the single drip-type beverage dispenser, the brew baskets comprising a bottom and a wall extending generally upwardly from the bottom to define a brewing reservoir, the bottom and wall being formed with a disposable rigid one-piece construction, the bottom having a drip port there through to permit a brewed beverage to flow from the brewing reservoir of the disposable brew basket into a single serving beverage container, the wall of the basket extending upwardly from the bottom to an open top, wherein the plurality of drip-type single serving disposable brew baskets comprises a number of the brew baskets related to the number of different lodging guests expected to stay in the room over the period of time.

9. The method of claim 8, wherein the disposable brew baskets constitute single serving disposable brew baskets and the brewing reservoir has a size dimensioned appropriate to make approximately only a single serving of beverage during a single brewing operation.

10. The method of claim 8, further comprising providing a plurality of disposable filter packs for use with the single beverage dispenser, the filter packs containing an amount of grounds to brew approximately only a single serving of brewed beverage.

11. The method of claim 8, further comprising providing of a number of separate beverage dispensers for an equal number of rooms, wherein the plurality of disposable brew baskets includes multiple disposable brew baskets for use with each of the separate beverage dispensers.

12. The method of claim 10, further comprising, after use of the brew basket and filter pack, replacing a used brew basket and a used filter pack in the room.

13. The method of claim 8, wherein the brew basket is held in a receptacle in the beverage dispenser directly above a single serving beverage container.

14. The method of claim 1, wherein the wall is tapered outwardly between the bottom and top.

15. The method of claim 8, wherein the wall is tapered outwardly between the bottom and top.

16. The method of claim 1, wherein the open top has a perimeter that is at least as large as a perimeter of the wall.

17. The method of claim 8, wherein the open top has a perimeter that is at least as large as a perimeter of the wall.

* * * * *